United States Patent [19]
Wood

[11] Patent Number: 4,595,711
[45] Date of Patent: Jun. 17, 1986

[54] AROMATIC POLYESTER POLYOLS FLUOROCARBON COMPATIBILIZED WITH ETHOXYLATE PROPOXYLATE COMPOUNDS FOR URETHANE AND ISOCYANURATE FOAMS

[75] Inventor: Robert J. Wood, Round Lake Park, Ill.

[73] Assignee: Stepan Company, Northfield, Ill.

[21] Appl. No.: 725,394

[22] Filed: Apr. 22, 1985

Related U.S. Application Data

[63] Continuation-in-part of Ser. No. 622,670, Jun. 20, 1984, Pat. No. 4,529,744, which is a continuation-in-part of Ser. No. 436,551, Oct. 25, 1982, abandoned.

[51] Int. Cl.$^4$ .............................................. C08G 18/14
[52] U.S. Cl. ..................... 521/158; 252/182; 521/164; 521/167; 521/168; 521/169; 521/173
[58] Field of Search ............... 521/158, 164, 167, 168, 521/169, 173; 252/182

[56] References Cited

U.S. PATENT DOCUMENTS

| | | | |
|---|---|---|---|
| 3,078,315 | 2/1963 | Steele et al. | 252/174.21 |
| 3,362,979 | 1/1968 | Bentley | 260/453 |
| 3,745,133 | 7/1973 | Comunale et al. | 260/2.5 |
| 4,246,364 | 1/1981 | Koehler et al. | 521/167 |
| 4,313,847 | 2/1982 | Chasin et al. | 252/356 |
| 4,323,657 | 4/1982 | Mazanek et al. | 252/182 |
| 4,439,549 | 3/1984 | Brennan | 252/182 |

OTHER PUBLICATIONS

Hughes et al paper given at SPI 25 Annual Urethane Surtech Conference, Oct. 29, 1979.

Primary Examiner—Maurice J. Welsh
Attorney, Agent, or Firm—Hill, Van Santen, Steadman & Simpson

[57] ABSTRACT

Polyol blend compositions are provided containing nonionic ethoxylate propoxylate compounds and aromatic ester polyols, especially phthalate polyester polyols, which blends are miscible with fluorocarbon blowing agents. These blends are suitable for reaction with polyfunctional organic isocyanates in the presence of polymerization catalysts to make cellular polyurethanes and polyisocyanurates.

17 Claims, No Drawings

AROMATIC POLYESTER POLYOLS FLUOROCARBON COMPATIBILIZED WITH ETHOXYLATE PROPOXYLATE COMPOUNDS FOR URETHANE AND ISOCYANURATE FOAMS

RELATED APPLICATION

This application is a continuation-in-part of my earlier filed U.S. patent application Ser. No. 622,670, filed June 20, 1984, now U.S. Pat. No. 4,529,744, which in turn is a continuation-in-part of my earlier filed U.S. patent application Ser. No. 436,551, filed Oct. 25, 1982, now abandoned.

BACKGROUND OF THE INVENTION

1. Field of the Invention

This invention relates to cellular polyurethanes and polyisocyanurates and to intermediates therefor, especially novel fluorocarbon compatibilized, homogeneous polyol blends, resin precursor blends incorporating such polyol blends, and their usage in processes for making such cellular products.

2. Description of the Prior Art

Cellular polyurethanes and polyisocyanurates are well known in the art for use in thermal insulating applications. Minor amounts of certain polyols are commonly added to the foam forming composition to modify foam properties. When a fluorocarbon blowing agent is employed, a problem in compatibility between the polyol (especially aromatic polyester polyols) and such fluorocarbon may arise in resin precursor blends.

As those skilled in the art appreciate, the preparation of polyol blends and resin precursor blends (which typically commercially comprise such polyol blends, blowing agent, cell stabilizing surfactant, and trimerization catalyst) in the isocyanate polymerization art can involve multi-component mixtures. While sometimes a blend of different polyols present in a resin precursor blend can overcome fluorocarbon compatibility problems, characteristically when aromatic polyester polyols are used, such compatibility problems are believed to be difficult to overcome without using a compatibility agent. Aromatic polyester polyols are desirable for use in such blends because they have a relatively low cost yet can produce product foams of good physical characteristics.

Aromatic polyester polyols, however, apparently cannot be blended directly with usable amounts of fluorocarbon blowing agents because of mutual insolubility characteristics. Compatibility agents can be employed in polyol blends and resin precursor blends to produce miscibility between the fluorocarbons and the polyols. However, compatibility agents, especially when employed at the relatively high levels needed to achieve a desired level of compatibilization, can adversely interfere with the characteristics desired in a foam produced from a blend incorporating such.

A class of amide diols is disclosed in U.S. Pat. No. 4,246,364 as being useful compatibility agents for such polyols and fluorocarbon blowing agents when material of such class is employed at the relatively high rate of from about 20 to 70 weight percent apparently on a 100 weight percent total polyol weight basis. Certain types of poly diols, such as aromatic ester diols produced from reacting aromatic esters with low molecular weight aliphatic polyols, appear to be so incompatible with fluorocarbon blowing agents that, in a polyol blend containing such aromatic polyester polyols in relatively high percentages, large amounts of such an amide diol appear to be needed to achieve compatibility with fluorocarbon blowing agents. When such a large quantity of amide diol is employed, the cost of foam manufacture increases (because of the cost of the amide diol).

One class of aromatic polyester polyols which has heretofore been successfully employed in this art, and which is relatively incompatible with fluorocarbon blowing agents, but which is compatibilizable therewith by using an amide diol of the above referenced Koehler et al '364 U.S. Patent, comprises polyester polyol reaction products of a low molecular weight polyether polyol, such as diethylene glycol, with poly(carbomethoxy-substituted) diphenyls and/or benzyl esters. Such product polyols are available commercially under the trademark "Terate" from ICI Americas, Inc. and "Urol" from UCT, Inc. Such diethylene glycol diphenyl and benzyl esters are typically commercially used at rates apparently ranging up to about 70 to 90 weight percent of a total polyol blend in making polyisocyanurate foam products. As a class, such "Terate" type polyol compositions are characteristically primarily based on diphenyl esters, while another type of such aromatic ester polyol, the phthalate polyester polyols, are primarily based essentially on single aromatic substituted monophenyl ring structures.

Certain monofunctional hydroxyl terminated nonionic surfactants, such as, for example, polyethoxylated alkyl phenol nonionics that contain not more than about 15 moles of condensed ethylene oxide per molecule, and thus have molecular weights substantially below about 900, are believed to have been heretofore used as compatibility agents for polyol/fluorocarbon blowing agent resin precursor systems (see Hughes, J. M. & Clinton, J. L. "Development Of Lower Cost Polyurethane Modified Polyisocyanurate And Polyurethane Rigid Foams" paper given at (SPI 25th Annual Urethane Technical Conference 10/29/79). These prior art nonionic compatibility agents contain substantially no propylene oxide. Particularly when formulating blends of phthalate ester polyols with fluorocarbon blowing agents, it appears to be necessary, in order to achieve the desired blend homogeneity, to use significantly high concentrations of such prior art nonionic surfactants for specified respective amounts of specified aromatic polyester polyols and fluorocarbon blowing agents which is undesirable not only from a cost standpoint, but also from a standpoint of degrading product foam properties, such as compressive strength. The foam property degradation can be so great as to make the product foams unusable and unsuitable for many conventional commercial foam applications. This property deterioration is attributed in theory (and there is no intent to be bound herein by theory) to the circumstance that the monohydroxyl funtionality of such surfactants makes them react as chain terminating components in the polyurethane and/or polyisocyanurate polymerization reaction, thereby producing excessive amounts of low molecular weight urethane and/or isocyanurate polymer which may result in such losses in desirable product properties.

Previously, I discovered that a mixture of, for example, an amide diol of the above referenced Koehler et al '364 U.S. Patent with a certain type of block ethoxylate propoxylate compound was useful even at relatively high concentration levels for comptabilizing fluorocarbon blowing agents with aromatic polyester polyols; see my aforereferenced application U.S. Ser. No. 622,670. The present application relates to my further discovery that certain ethoxylate propoxylate compounds are usable is desired by themselves at relatively low concentration levels as compatibility agents for such aromatic polyester polyols.

There remains a need in the art for new and improved compatibility agents which will permit one to compatibilize polyols, especially aromatic polyester polyols, with fluorocarbon blowing agents and thereby achieve complete blend homogeneity and solubilization without causing any substantial deterioration in product foam properties.

BRIEF SUMMARY OF THE INVENTION

This invention is directed in one respect to a miscible polyol blend composition useful in the preparation of polyurethane and polyisocyanurate foams which composition comprises on a 100 weight percent total weight basis:

(A) from about 0.01 to 50 weight percent of at least one nonionic block ethoxylate propoxylate compound of the formula:

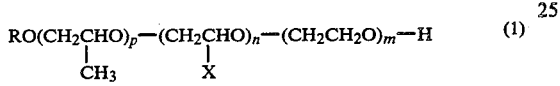

wherein:

R is a radical selected from the group consisting of alkyl phenyl radicals wherein the alkyl group in each such radical contains from about five to eighteen carbon atoms; alkyl radicals each containing from two through eighteen carbon atoms; and radicals of the formula:

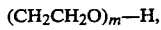

X is selected from the group consisting of methyl and hydrogen, p is a positive whole number ranging from about 1 to 5, n is a positive whole number ranging from about 10 to 70, m is an independently selected positive whole number ranging from about 15 to 250, and the sum of m plus n plus p is a number in the range from about 35 to 200 in any given molecule;

(B) from about 5 to 93 weight percent of at least one aromatic ester polyol characterized by having a molecular weight in the range from about 200 to 1200, an hydroxyl value ranging from about 45 to 2000, a funtionality ranging from 2 to 8, and a molecular structure selected from the group consisting of monophenyl polyesters, diphenyl polyesters, and benzyl polyesters; and (C) from and including 0 to about 95 weight percent of at least one other polyol characterized by having a molecular weight in the range from about 60 to 1200, an hydroxyl value in the range from about 45 to 1600, and a functionality in the range from about 2 to 8, and which is preferably selected from the class consisting of the so-called "second hydroxyl containing polyols" hereinbelow identified.

The term "polyol" as used herein has reference to a molecule containing two or more hydroxyl groups.

In any given such polyol blend composition, the above indicated components are selected so as to result in a product polyol blend composition having an hydroxyl number in the range from about 150 to 600.

In such a polyol blend composition, such aromatic ester polyol is preferably characterized by the generic formula:

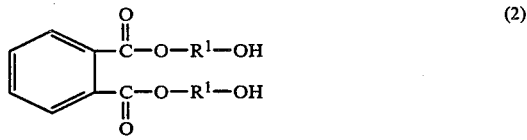

wherein:

$R^1$ is a divalent radical selected from the group consisting of:

(a) alkylene radicals each containing from 2 through 6 carbon atoms, (b) alkoxyalkylene radicals each containing one oxygen atom and from 3 through 7 carbon atoms, (c) radicals of the formula:

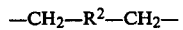

$R^2$ is a radical selected from the group consisting of:

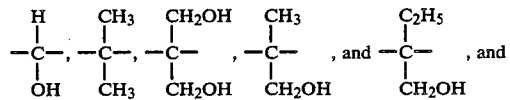

(d) radicals of the formula:

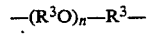

where $R^3$ is an alkylene radical containing from 2 through 4 carbon atoms and n is an integer of from 2 through 6.

Preferably $R^1$ in formula (2) is a radical such as $-CH_2CH_2OCH_2CH_2-$ (presently most preferred), $-CH_2CHOHCH_2-$,

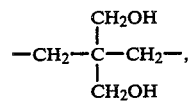

and the like.

In any given such ethoxylate propoxylate compound of formula (1), in any n number of radicals of the formula:

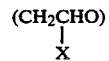

in formula (1), a mixture of propoxy and ethoxy groups can be present, or substantially all the groups can be either ethoxy or propoxy.

One presently preferred class of formula (1) compounds is characterized by the formula:

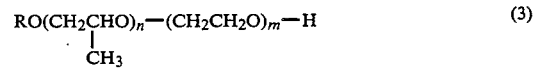

where n is a positive whole number of from about 25 to 70, m is a positive whole number of from about 50 to 150, and the sum of n plus m ranges from about 35 to 200.

This invention is also directed in another aspect to miscible blends comprising a combination of the above polyol blend composition with a fluorocarbon blowing agent (with water as an optional blowing agent also being present).

This invention is also directed in another aspect to miscible blends comprising a combination of an above defined polyol blend composition with a fluorocarbon blowing agent (and optionally water, a cell stabilizing surfactant, and an isocyanate or isocyanurate forming catalyst.

This invention is also directed in another aspect to a process for the preparation of polyisocyanurate cellular polymers which utilizes, as a blended starting component, the above polyol blend composition in combination with a fluorocarbon (and optionally water), a cell stabilizing surfactant, blowing agent system and an isocyanate trimerization catalyst in reaction with an organic polyisocyanate. A polyether polyol can also optionally be present.

This invention is further directed in another aspect to the cellular polyisocyanurate polymers produced from the practice of the above process.

One primary purpose of the present invention is to provide new polyol blends which find particular utility, as described herein, as minor or major components in the preparation of new polyisocyanurate foams, particularly those foams prepared by using conventional foam laminating machinery and conventional pour-in-place foam equipment, and which foams have physical and chemical properties of commercially acceptable level as regards typical end use applications for prior art polyisocyanurate foams, especially in building construction for thermal insulation.

Another primary purpose of the present invention is to provide polyol blends of the type indicated above which are compatible with fluorocarbon blowing agents and which can also contain significant quantities of aromatic polyester polyols which are difficult to compatibilize with fluorocarbon blowing agents.

Other and further purposes, aims, objects, features, advantages, embodiments, and the like will be present to those skilled in the art from the teachings of the present specification taken with the claims.

DETAILED DESCRIPTION

In polyol blends of this invention intended for use in the manufacture of polyurethanes, it is now preferred that a polyol blend composition of this invention comprise (on a total weight basis):

(A) from about 0.01 to 6 weight percent of such nonionic ethoxylate propoxylate compound of formula (1), (B) from about 5 to 60 weight percent of such above characterized aromatic ester polyol, and (C) from about 20 to 95 weight percent of such second hydroxyl group containing polyol.

In polyol blends of this invention intended for use in the manufacture of polyisocyanurates, it is now preferred that a polyol blend composition of this invention comprise (on a total weight basis):

(A) from about 6 to 20 weight percent of such nonionic ethoxylate propoxylate compound of formula (1), (B) from about 20 to 93 weight percent of such above characterized aromatic ester polyol, and (C) from and including 0 to about 40 weight percent of such second hydroxyl group containing polyol.

In polyol blends of this invention, compounds of formula (1) appear to be more effective as compatibility agents than the polyethoxylated alkyl phenol materials used in the prior art at equivalent dosage rates.

The polyol blends of this invention are prepared by simply mixing together, in the quantities above indicated, the respective above indicated components in any suitable mixing zone (vessel, tank, etc.).

Preferably, at least one nonionic ethoxylate propoxylate compound of formula (1) is employed within a range of from about 5 to 20 weight percent while the aromatic polyester polyol preferably ranges from about 60 to 85 weight percent (on a total polyol blend basis). Preferably, the second hydroxyl containing polyol is employed at a rate ranging from and including 0 to about 20 weight percent (same basis as above).

In one presently preferred type of formula (1) compound, R is nonylphenyl, X is methyl, n is about 15 to 70, m is about 40 to 120, and the sum of n plus m extends from about 60 to 150.

While any convenient preparation procedure can be employed compounds of formula (1) are preferably prepared by the propoxylation and ethoxylation of an alcohol, such as butanol, or of an alkyl phenol, such as nonyl- or octyl-phenol, in the presence of an appropriate alkoxylation catalyst, as those skilled in the art appreciate.

Compounds of formula (2) can be prepared by any convenient procedure as those skilled in the art appreciate. By one preferred procedure, phthalic acid anhydride is contacted with a polyol of the formula:

$$HO-R^1-OH \qquad (4)$$

wherein: $R^1$ is a divalent radical identical to the definition of of $R^1$ above in the definition of formula (2).

Preferred polyols of formula (4) are those wherein $R^1$ corresponds to the preferred definition of $R^1$ above in formula (2). One class of preferred polyester polyols of formula (2) is made using a substantially pure phthalic anhydride starting material.

Examples of suitable glycol starting materials of formula (4) include ethylene glycol, diethylene glycol, propylene glycol, dipropylene glycol, trimethylene glycol, butylene glycols, glycerol, 1,2,6-hexanetriol, 1,1,1-trimethylolethane, 1,1,1-trimethylolpropane, 3-(2-hydroxyethoxy)-1,2-propanediol, pentaerythritol, 1,2-cyclohexanediol, poly (oxyalkylene) polyols containing from two to four carbon atoms derived by the condensation of ethylene oxide, propylene oxide and any combination thereof, and the like. As those skilled in the art will appreciate, in the preparation of mixed poly(oxyethyleneoxypropylene) polyols, the ethylene and propylene oxides may be added to a starting hydroxyl-containing reactant either in admixture or sequentially. A presently most preferred starting polyol for reaction with a phthalic anhydride starting material is diethylene glycol.

Preferably, a contacting between phthalic anhydride and a starting polyol of formula (4) above is carried out at a temperature ranging from about 200° to 230° C., though lower and higher temperatures can be employed if desired. During the contacting, the reactants are preferably agitated. Preferably approximately stoichiometric amounts of phthalic anhydride and polyol are employed. Preferably the contacting is continued until the hydroxyl value of the reaction mass falls in the range from about 200 to 600, and also the acid value of the reaction mass ranges from about 0.5 to seven.

Alternatively, phthalic acid (rather than the anhydride) can be reacted with a polyol of formula (4). In the case of making aromatic poly(oxyalkylene) polyols of formula (2), one can conveniently directly condense the phthalic acid with a desired number of moles of ethylene oxide and/or propylene oxide (either in admixture or sequentially as desired) preferably in the presence of an alkoxylation catalyst.

The esterification reaction used for producing an aromatic polyol of formula (2) may, if desired, be carried out in the presence of a catalyst as those skilled in the art will appreciate. Suitable catalysts include organotin compounds, particularly tin compounds of carboxylic acids, such as stannous octoate, stannous oleate, stannous acetate, stannous laurate, dibutyl tin dilaurate, and other such tin salts. Additional suitable catalyst include metal catalysts, such as sodium and potassium acetate, tetraisopropyl titanates, and other such titanate salts, and the like.

Another particularly preferred class of compounds of formula (2) is one which is prepared by esterifying a phthalic anhydride bottoms composition, a phthalic anhydride crude composition, or a phthalic anhydride light ends composition, as such compositions are hereinbelow defined, with preferred polyols of formula (4), and the esterification thereof is conveniently carried out as hereinbelow described.

In combination with, or in lieu of using an aromatic ester polyol of formula (2) as the aromatic ester polyol, one can employ other aromatic ester polyols such as, for examples, the afore indicated reaction products of polyether polyols with poly (carbomethoxy-substituted) diphenyls and/or benzyl esters, or reaction products of glycols (especially glycols of formula (4)) with polyethylene terephthalate residue products such as are obtained from the manufacture of film, bottles, fibers, or like articles comprised of polyethylene terephthalate.

The other polyol (that is, the "second hydroxyl containing polyol") employable in a polyol blend composition of this invention as defined above comprises at least one hydroxyl containing polyol as characterized above and which is selected to as to produce a starting such polyol having a molecular weight, hydroxyl number, and funtionality in the respective ranges above indicated. In general, such other polyol can be any hydroxyl containing polyol (other than a formula (2) polyol) having such property combination as above indicated. Preferably, such other polyol has a molecular weight ranging from about 60 to 600, an hydroxyl value of from about 100 to 1000, and a functionality of from 3 to 5, inclusive. Aliphatic other polyols are presently preferred. Included are diols, triols, and tetaols. Examples of suitable classes of polyol types (herein termed "second hydroxyl containing polyols") include:

(a) polyalkoxylated Mannish bases prepared by reacting phenols with diethanol amine and formaldehyde;
(b) polyalkoxylated glycerines;
(c) polyalkoxylated sucrose;
(d) polyalkoxylated aromatic and aliphatic amine based polyols;
(e) polyalkoxylated sucrose-amine mixtures;
(f) hydroxyalkylated aliphatic monoamines and/or diamines;
(g) aliphatic polyols (including alkylene diols, cycloalkylene diols, alkoxyalkylene diols, polyether polyols, halogenated polyether polyols, and preferably polyols of formula (3) above);
(h) polybutadiene resins having primary hydroxyl groups (see Poly Bd Liquid Resins Product Bulletin BD-3 October 1974, Arco Chemical Company, Div. of Atlantic Richfield, New York, N.Y.); and
(i) phosphorous containing polyols; and the like.

Illustrative but non-limiting examples of suitable particular polyols for use as the second hydroxyl containing polyol include ethylene glycol, diethylene glycol, 1,3-propanediol, 1,4-butane diol, and other butylene glycols, glycerine, dipropylene glycol, trimethylene glycol, 1,1,1-trimethylol propane, pentaerythritol, 1,2,6-hexanetriol, 1,1,1-trimethylolethane, 3-(2-hydroxyethoxy)-1,2-propane diol, 1,2-cyclohexanediol, triethylene glycol, tetraethylene glycol, and higher glycols, or mixtures thereof (with molecular weights falling within the range above indicated) ethoxylated glycerine, ethoxylated trimethylol propane, ethoxylated pentaerythritol, and the like, polyethylene succinate, polyethylene glutarate, polyethylene adipate, polybutylene succinate, polybutylene glutarate, polybutylene adipate, copolyethylenebutylene succinate, copolyethylenebutylene glutarate, copolyethylene butylene adipate, and the like hydroxyl terminated polyesters, bis (beta-hydroxyethyl) terephthalate, bis (beta-hydroxyethyl) phthalate, and the like di (polyoxyethylene) succinate, polyoxydiethylene glutarate, polyoxydiethylene adipate, polyoxydiethylene adipate glutarate, and the like hydroxyl terminated polyesters; diethanolamine, triethanolamine, N,N'-bis (beta-hydroxyethyl) aniline, and the like, sorbitol, sucrose, lactose, glycosides such as alpha-methylglucoside and alpha-hydroxyalkyl glucoside, fructoside, and the like; compounds in which hydroxyl groups are bonded to an aromatic nucleus such as resorcinol, pyrogallol, phloroglucinol, di-, tri-, and tetraphenylol compounds, such as bis-(p-hydroxyphenyl)-methane and 2,2-bis-(p-hydroxyphenyl)propane, cocoamides, alkylene oxide adducts of Mannich type products prepared by reacting phenols, diethanolamine and formaldehyde, and many other such polyhydroxyl compounds known to the art.

Presently preferred such second hydroxyl group containing polyols are alkylene and/or lower alkoxyalkylene dioles, especially of formula (3), such as diethylene glycol or propylene glycol, mixtures thereof, and the like which each have a molecular weight of from about 69 to 400. By the term "lower" as used herein, reference is had to a radical containing less than eight carbon atoms.

Presently preferred polyol blends of this invention contain from about 2.0 to 25 weight percent on a 100 weight percent total polyol blend basis of such preferred diols (as second hydroxyl containing polyols). Presently preferred resin blends of this invention utilize such preferred polyol blends.

In a preferred class of polyol blends of this invention, from about 10 to 50 weight percent of a fluorocarbon blowing agent, with optionally from and including 0 up to about 25 weight percent (as a blowing agent system) is also present on a 100 weight percent total composition basis. Unexpectedly, such a fluorocarbon blowing agent is miscible with such blend. Preferably at least about 20 weight percent thereof comprises such fluorocarbon blowing agent. A blend of such class can also contain from and including 0 up to about 10 weight percent of a cell stabilizing surfactant. The balance up to 100 weight percent thereof comprises a polyol blend composition of this invention as above described.

The particular percentage of fluorocarbon blowing agent to be dissolved in any given blend will influence, in any given composition, the exact, or optimized, respective quantities of the individual components employed, particularly the quantity of formula (1) compound(s) used, within the respective ranges above set forth. In general, the smaller the quantity of compound(s) of formula (2) present in a product blend, the greater is the amount of fluorocarbon blowing agent which can be dissolved in the blend for a given amount of formula (1) compound(s) used, there always being present at least sufficent quantity of formula (1) compound to render the desired quantity fluorocarbon blowing agent miscible with a polyol blend composition. When relatively large quantities of formula (2) compounds are used, within the range indicated above, in a polyol blend, it is presently preferred to employ, as the second hydroxyl containing polyol, alkylene diols and/or lower alkoxyalkylene diols each having molecular weights of less than about 400. In any given blend, the particular proportions of formula (2) polyol relative to such second hydroxyl containing polyol for a given quantity of formula (1) material can be easily determined by one skilled in the art through trial and error in order to determine the amount of fluorocarbon blowing agent incorporated into a given product blend desired to achieve a particular effect.

The fluorocarbon used as a blowing agent can be anyone of the fluorocarbons known to those skilled in the art for use in blowing polymer mixtures into cellular polyisocyanurates. In general, such blowing agents can be, if desired, additionally substituted by chlorine and/or bromine in addition to fluorine. Suitable initially liquified fluorocarbon blowing agents are low boiling gases and include aliphatic and cycloaliphatic fluorocarbons which vaporize at or below the temperature of the foaming mass. Such gases are at least partially fluorinated and may also be otherwise halogenated. Illustrative of presently preferred fluorocarbon blowing agents are trichloromonofluoromethane, dichlorodifluoromethane, 1,1-dichloro-1-fluoroethane, 1,1,1-trifluoro-2-fluoro-3,3-difluoro,4,4,4-trifluorobutane, hexafluorocyclobutene, octafluorocyclobutane, and the like; see also U.S. Pat. No. 3,745,133, column 11, lines 25 to 38 which disclosure relating to fluorocarbon blowing agents is incorporated by reference herein. When water is used as a blowing agent, it can be present, if desired, in an amount from zero ranging to about 25 weight percent (total blend basis) preferably in combination with fluorocarbon; however, in making polyisocyanurate foams, it is preferred that the water content not exceed about 10 weight percent.

In a preferred class of polyol blends of this invention, there is additionally present an isocyanate or isocyanurate catalyst on a total weight basis in a range from about 0.1 to 10 weight percent with the balance of about 90 to 99.5 weight percent of a blend up to 100 weight percent thereof comprising a polyol blend composition of this invention containing also fluorocarbon blowing agent. Preferably this range extends from about 2 to 8 weight percent with the balance (92 to 98 weight percent) being such a combination of polyol blend composition and fluorocarbon blowing agent.

Minor amounts (typically less than about 10 wt %) of other optional additives can be added to a blend composition of this invention without detracting from the miscibility and stability of product blends. Such other additives can include, for examples, cell stabilizing surfactants, non-reactive and reactive flame retardants, and the like, such as are commonly employed in the art of making cellular polyisocyanurates or polyurethanes.

Surprisingly, the fluorocarbon blowing agent and the polyol blend (with or without the presence of such catalyst) are completely miscible in each other with substantially no separation occuring during storage, such miscibility being due to the presence of compound(s) of formula (1).

A polyol blend composition with miscile added fluorocarbon blowing agent and catalyst and preferably cell stabilizing surfactant may be reacted with organic isocyanates to produce product polyisocyanurate foams having acceptable physical properties, such as foam stability, friability, compressive strength, and the like.

In, for example, the preparation of a polyurethane or polyisocyanurate foam of the present invention, a polyol blend composition in admixture with a fluorocarbon (and optionally water) blowing agent, cell stabilizing surfactant and a trimerization and/or a urethane forming catalyst can comprise a so-called resin precursor or B side component or composition for reaction with a so-called A side component or composition comprised of organic polyisocyanate. The respective quantities of B side blend components are as indicated above.

Thus, for a polyisocyanurate foam, a B blend contains from about 0.5 to 10, preferably from about 3 to 6 weight percent, of a trimerization catalyst, and the balance comprises from about 90 to 99.5, preferably from about 94 to 97, weight percent, of polyol blend composition in combination with fluorocarbon blowing agent on a total 100 percent weight basis. The fluorocarbon blowing agent is present in the range from about 10 to 50 weight percent (same basis), with the balance of B side blend components thus being from about 50 to 90 weight percent (total weight basis). Preferably from about 1 to 3 weight percent cell stabilizing surfactant is also present. At the time of mixing a B side blend and A side blend, the total hydroxyl equivalents present in such a B side blend ranges from about 0.20 to 0.50 (and preferably from about 0.20 to 0.40) per each NCO equivalent of such A side polyisocyanate. For a polyurethane foam a B blend contains from about 0.1 to 10, preferably about 0.5 to 3.0 weight percent of a urethane forming catalyst, and the balance comprises from about 85 to 99.9, preferably about 97.0 to 99.5, weight percent, or a polyol blend composition in combination with fluorocarbon blowing agent on a total weight basis. The fluorocarbon blowing agent is present in the range from about 5 to 50 weight percent (same basis), preferably from about 15 to 35 weight percent, with the balance of B side blend components thus being from about 50 to 95, and preferably from about 65 to 85, weight percent (total weight basis). Preferably from about 3 to 10 weight percent of a cell stabilizing surfactant is also present. At this time of mixing of B side blend and A side blend, the total hydroxyl equivalents present in such a B side blend ranges from about 0.60 to 1.10 per NCO equivalent of such A side polyisocyanate.

Polyol blends of this invention can be made separately and converted to a resin blend, or such can be formed as a part of a resin blend as described herein.

One presently preferred class of resin blend formulations of this invention (which incorporate polyol blends to this invention) is characterizable as follows:

TABLE IA

COMPOSITION OF PREFERRED RESIN PRECURSOR BLENDS FOR POLYISOCYANURATE FOAMS
(100 weight percent basis)

| Component | wt % preferred range | wt % more preferred range |
|---|---|---|
| (A) nonionic ethoxylate propoxylate compound of formula (1) | about 6 to 20 | about 6 to 15 |
| (B) aromatic ester polyol of formula (2) | about 20 to 93 | about 35 to 65 |
| (C) second hydroxyl containing polyol (dialkylene glycols and alkoxylated glycerine) | from and including 0 to about 30 | about 1 to 10 |
| (D) fluorocarbon blowing agent | about 10 to 50 | about 20 to 35 |
| (E) water | about 0.1 to 10 | about 0.5 to 2 |
| (F) trimerization catalyst | about 0.5 to 10 | about 3 to 6 |
| (G) cell stabilizing surfactant | about 0.1 to 10 | about 1 to 3 |

TABLE IB

COMPOSITION OF PREFERRED RESIN PRECURSOR BLENDS FOR POLYURETHANE FOAMS
(100 wt % basis)

| Component | Preferred Range (weight percent) | More Preferred Range weight percent |
|---|---|---|
| (1) at least one compound of formula (1) | about 0.1 to 6 | about 2 to 3 |
| (2) at least one compound of formula (2) | about 1 to 50 | about 5 to 40 |
| (3) second primary hydroxyl polyol having a functionality of at least 3 and no more than 8 | about 10 to 95 | about 20 to 40 |
| (4) catalyst (polyurethane forming) | about 0.1 to 10 | about 0.5 to 1.5 |
| (5) fluorocarbon blowing agent | about 10 to 50 | about 15 to 30 |
| (6) water | about 0.0 to 25 | about 0.1 to 1.0 |
| (7) cell stabilizing surfactant | about 0.1 to 10 | about 1.0 to 3.0 |

Preferably the viscosity of such a formulation of Table IA or IB ranges from about 100 to 2000 centipoises at 25° C. (measured, for example, with a Brookfield viscometer with a #2 spindle operating at 12 rpm) and the hydroxyl number of the total B side blend thereof falls in the range from about 100–300.

It is preferred to employ in the Table I compositions as shown from about 1 to 3 weight percent (based on total resin or B side component blend) of a cell stabilizing surfactant which improves and promotes development of fine, uniform foam cells. Presently preferred such cell stabilizing surfactants are commercially available and include silicones, such as dimethyl polysiloxane-polyalkylene oxide copolymers. Organic cell stabilizing surfactants are also known to this art.

Preferred resin blend formulations of Table IA utilize as shown second hydroxyl containing polyols which have a functionality less than about 5. More preferred second hydroxyl containing polyols are presently dialkylene glycols, such as diethylene and dipropylene glycol, and polyalkoxylated glycerines containing from about 3 to 6 moles of condensed alkylene oxide.

A trimerization catalyst employed in the practice of this invention can be any catalyst known to those skilled in the art which will catalyze the trimerization of an organic isocyanate compound to form the isocyanurate moiety. For examples of suitable isocyanate trimerization catalysts, see The Journal of Cellular Plastics, November/December 1975, page 329; U.S. Pat. Nos. 3,745,133, 3,896,052, 3,899,443, 3,903,018, 3,954,684, and 4,101,465, the disclosures of these references being hereby incorporated by reference herein. Such catalysts are well known to those skilled in the art.

The preferred resin blend formulations of Table IB utilize as shown second hydroxyl containing polyols which have a funtionality of at least 3. More preferred second primary hydroxyl polyols have a functionality of from about 4 to 8.

In the preferred resin formulations of Table I, a presently preferred urethane forming catalyst is of a tertiary secondary or primary amine and or a tin type catalyst.

The urethane forming catalyst employed in general can be any catalyst known to those skilled in the art which will catalyze the polymerization of an organic isocyanate compound to form the urethane moiety. Examples of suitable urethane forming catalysts include metal salts such as sodium, lead, and tin, also primary, secondary and tertiary amines.

The organic polyisocyanates employable in the practice of this invention can be the same as those previously employed in the art for making polyisocyanurates and polyurethanes. Such materials are well known to those skilled in the art.

Among the suitable polyisocyanates are those represented by the general formula:

$$Q(NCO)_i \qquad (4)$$

wherein:

$i$ has an average value of at least two, and Q is an aliphatic, cycloaliphatic or aromatic radical which can be an unsubstituted hydrocarbyl group or a hydrocarbyl group substituted, for example, with halogen or alkoxyl.

For example, Q can be an alkylene, cycloalkylene, arylene, alkyl-substituted cycloalkylene, alkylene or aralkylene radical including corresponding halogen-substituted radicals. Typical examples of suitable polyisocyanates known to the art for use in preparing cellular polyisocyanurates are: 1,6-hexamethylene diisocyanate, 1,4-tetramethylene diisocyanate, 1-methyl-2,4-diisocyanatocyclohexane, bis(4-isocyanatophenyl)methane, phenylene diisocyanates such as 4-methoxy-1,3-phenylenediisocyanate, 4-chloro-1,3-phenylenediisocyanate, 4-bromo-1,3-phenylenediisocyanate, 5,6-dimethyl-1,3-phenylenediisocyanate, 2,4-tolylene diisocyanates, crude tolylene diisocyanate, 6-isopropyll-1,3-phenylenediisocyanate, durylene diisocyanate and triphenylmethane-4,4',4''-triisocyanate. Other suitable polyisocyanate reactants are ethylphosphonic diisocyanate and phenylphosphonic diisocyanate. Also useful are the polyisocyanates of the aniline-formaldehyde polyaromatic type which are produced by phosgenation of the polyamine obtained by acid catalyzed condensation of aniline with formaldehyde. Polyphenylmethylene polyisocyanates of this type are available commercially under such trade names as PAPI, Mondur, Rubinate, and the like. Those products are low viscosity (about 50–2500 centipoises at 25° C.) liquids having average isocyanate functionalities in the range of about 2.0 to about 3.2 or higher, depending upon the specific aniline-to-formaldehyde molar ratio used in the polyamine preparation. Other useful polyisocyanates are combinations of diisocyanates with polymeric isocyanates containing two or more isocyanate groups per molecule. Illustrative of such combinations are: a mixture of 2,4-toluene diisocyanate, 2,6-toluene diisocyanate and the aforesaid polyphenyl-methylene polyisocyanates; and a mixture of isomeric toluene diisocyanates with polymeric toluene diisocyanates obtained as residues from the manufacture of the diisocyanates.

In making the polyurethane and polyisocyanurate foams of this invention, especially laminates of such foams, the procedures and equipment conventional in the art are employed, for example, U.S. Pat. No. 3,896,052.

Compounds of formula (1) can be used in combination with other compatibility agents in preparing polyol blends of this invention if desired.

Surprisingly, compounds of formula (1) are believed to contribute to the cell stabilization of urethane and/or modified isocyanurate cellular polymer structures, when such compounds are blended into starting polyols and resin blends as taught herein.

EMBODIMENTS

The following examples are merely illustrative of the present invention and are not intended as a limitation upon the scope thereof.

Starting Materials

Example A

Phthalic anhydride of greater than 99.9 weight percent purity (available commercially from Stepan Chemical Company, Northfield, Illinois) is reacted with diethylene glycol as follows:

To a 3 liter, four-neck, round-bottom flask equipped with a stirrer, thermometer, nitrogren inlet tube, and a goose-neck condenser, there is added 740 grams (5 moles) of phthalic anhydride, and 1060 grams (10 moles) of diethylene glycol. The mixture is heated to 220° C. with stirring and kept at this temperature until the rate of water being removed slowed down.

Stannous octoate (100 ppm) is then added to the mixture and the heating continued until the acid number reached 6.2 The reaction mixture is then cooled to room temperature and analyzed. The hydroxyl number is found to be 288 and the acid number 6.2 Diethylene glycol is added to the mixture to increase the hydroxyl number to 315.

The product includes diethylene glycol phthalate molecules which have the structural formula of:

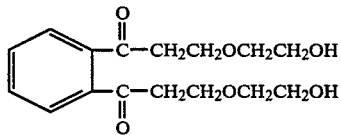

This product is a colorless liquid boiling at about 280° C. and having a viscosity of about 2500 centipoises. 25° C. and an hydroxyl number of about 315.

Example B

Phthalic anhydride is reacted with 1,1,1-trimethylolpropane as follows:

To a 5 liter, four-neck, round-bottom flask equipped with a stirrer, thermometer, nitrogen inlet tube, and a goose-neck condenser, there is added 1480 grams (10 moles) of phthalic anhydride and 2680 grams (20 moles) of trimethylolpropane. The mixture is heated to 190° C. with a stirring and kept at this temperature until the acid number is 5. The reaction mixture is then cooled to room temperature and analyzed. The hydroxyl number is found to be 565.2. The product is gel-like materal at 25° C. which includes molecules having the structural formula:

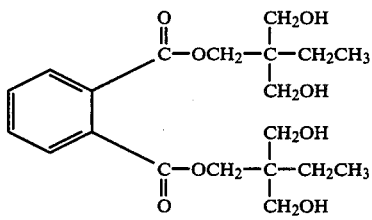

Example C

To a 5 liter, four-neck, round-bottom flask equipped with a stirrer, thermometer, nitrogen inlet tube, and a goose-neck condenser, there is added 1480 grams (10 moles) of phthalic anhydride and 2360 grams (20 moles) of 1,6-hexanediol. The mixture is heated to 190° C. with stirring and kept at this temperature until the acid number is 6 or lower. The reaction mixture is then cooled to room temperature and analyzed. The hydroxyl number is found to be 302.

Example D

To a 5 liter, four-neck, round-bottom flask equipped with a stirrer, thermometer, nitrogen inlet tube, and a goose-neck condenser, there is added 740 grams (5 moles) of phthalic anhydride and 1940 grams (10 moles) of tetraethylene glycol. The mixture is heated to 220° C. with stirring and kept at this temperature until the acid number reaches 6. The reaction mixture is then cooled to room temperature and analyzed. The hydroxyl number of the color less liquid product is found to be 238.

Example E

A specimen of a phthalic anhydride bottoms composition is obtained having:
(a) a phthalic anhydride content of about 60 weight percent (total composition basis),
(b) a hydroxyl number estimated to be about 0, and
(c) an acid number estimated to be about 700.

To a 3 liter, four-neck, round-bottom flask equipped with a stirrer, thermometer, nitrogen inlet tube and a goose-neck condenser there is added at ambient temperature and pressure 740 grams of the above pulverized phthalic anhydride bottoms and 1060 grams (10 moles) of diethylene glycol. The mixture is heated to 220° C. and kept at this temperature until the acid number of the reactant mixture is found to be about 7.0. The mixture is then cooled to room temperature and the hydroxyl number of the relatively viscous black liquid product is determined and found to be about 312.

Phthalic Anhydride Crude, Bottoms and Light Ends

The phthalic anhydride bottoms used as a starting material in the practice of the present invention results from the process of converting o-xylene to phthalic anhydride. This process is understood to be carried out by the steps of:

(A) contacting in the presence of excess oxygen (air) o-xylene of at least about 95 weight percent purity (on a total starting feed basis) with (preferably) a vanadium catalyst under vapor phase conditions involving a temperature ranging from about 360° to 400° C., and a pressure ranging from above 0 to about 10 psig, which conditions are maintained for a time sufficient to convert theoretically at least about 96 weight percent of the total starting o-xylene to phthalic anhydride, (B) desubliming the vapor phase product stream from the above contacting the produce a solid material at a temperature typically ranging from about 50° to 70° C. under about atmospheric pressure, (C) first heating the solid so produced to a temperature not less than about 130° C. which temperature is sufficient to liquify such solid at about atmospheric pressure, (D) secondly heating the liquid so produced to a temperature ranging from about 270° to 295° C. for a time at least sufficient to convert at least about 99 weight percent of all phthalic acid material in such liquid into phthalic anhydride, (E) first distilling the resulting liquid at a vapor phase temperature ranging from about 220° to 240° C. while maintaining an absolute pressure in the range from about 250 to 150 mm Hg and collecting and condensing substantially all such first distillate so produced, the first raffinate being so produced from such first distilling being maintained at a temperature ranging from about 240° to 260° C., and (F) secondly distilling said first raffinate at a vapor phase temperature ranging from about 240° to 260° C. while maintaining an absolute pressure in the range from about 250 to 350 mm Hg and collecting and condensing substantially all such second distillate so produced, the second raffinate being so produced in such second distilling being maintained initially at a temperature ranging from about 260° to 280° C.

The first distillate so produced is known as "light ends" or "phthalic anhydride light ends", while the second distillate so produced comprises substantially pure phthalic anhydride. The second raffinate so produced is known as "bottoms" or phthalic anhydride bottoms". The resulting liquid from the first heating is known as "crude" or "phthalic anhydride crude". The first and second distilling steps can be carried out either batchwise or continuously, as those skilled in the art appreciate. The crude, the light ends and the bottoms can each be regarded as having a somewhat variable composition, such compositional variations being the result of variations in the starting o-xylene feed, and also of variations in the exact conditions employed for the respective process steps.

Therefore, it is very difficult to state that the exact compositions of, respectively, all possible crudes, light ends and bottoms. Nevertheless, the respective characteristic compositions of crude, light ends and bottoms are distinctly different from one another. For example, a typical phthalic anhydride crude composition is now believed to be as follows (on a 100 weight percent total composition basis):

| | component | weight percent |
|---|---|---|
| (1) | phthalic anhydride | 96–99 |
| (2) | phthalic acid | 0.1–2.0 |
| (3) | trimellitic acid and/or acid anhydride | 0.2–0.3 |
| (4) | benzoic acid and/or acid anhydride | 0.1–0.2 |

Similarly, and for example, a typical phthalic anhydride light ends composition is now believed to be as follows (on a 100 weight percent total composition basis):

| | component | weight percent |
|---|---|---|
| (1) | phthalic anhydride | 45–90 |
| (2) | benzoic acid or benzoic acid anhydride | 7–42 |
| (3) | maleic acid or maleic acid anhydride | 3–13 |
| (4) | other components | less than 1.0% |

Similarly, and for example, a typical bottoms is now believed to have the following composition (on a 100 weight percent total basis):

| | component | weight percent |
|---|---|---|
| (1) | phthalic anhydride | 60–95 |
| (2) | trimellitic acid and/or trimellitic acid anhydride | 1.2–13 |
| (3) | anthraquinone | 0.5–4 |
| (4) | isophthalic acid or isophthalic acid anhydride | 0.3–2 |
| (5) | insolubles (as determined, for example, by using acetone as the solvent) | 3–20 |

Thus, characteristically, phthalic anhydride light ends contain mainly phthalic anhydride plus benzoic acid or benzoic acid anhydride plus maleic acid anhydride (or maleic acid), while characteristically phthalic anhydride bottoms contain mainly phthalic anhydride, trimellitic acid and/or trimellitic acid anhydride plus insolubles. Characteristically, phthalic anhydride crude contains phthalic anhydride, phthalic acid, trimellitic acid and/or trimellitic acid anhydride), plus benzoic acid (and/or benzoic acid anhydride).

In actual commercial practice, it is believed that, in a bottoms composition, the quantity of phthalic anhydride present can range from a low of about 10 weight percent to a high of about 99 weight percent on a 100 weight percent total bottoms basis, with the balance up to 100 weight percent thereof in any given bottoms compositions being mainly trimellitic acid and/or trimellitic acid anhydride plus insolubles.

Similarly, in actual commercial practice, it is believed that, in a light ends composition, the quantity of phthalic anhydride present can range from a low of about 45 weight percent up to a high of about 90 weight percent on a 100 weight percent total light ends basis, with the balance up to 100 weight percent thereof in any given light ends composition being mainly benzoic acid, (of benzoic acid anhydride) and maleic acid anhydride (or maleic acid).

For purposes of practicing the present invention, particularly on a commercial scale, as those skilled in the art will readily appreciate, it may be desirable, and indeed it is presently preferred, to standardize bottoms (or light ends, or crude, all as the case may be) compositions so that successive runs in making a given produce composition of the present invention will tend to produce nearly identical systems (when identical process conditions are employed). Crude, bottoms and/or light ends can each be regulated generally as to composition either by controlling the process conditions (for example, the second distilling step) used for phthalic anhydride production (from a constant feedstock) or by post-process addition to a crude, bottoms or light ends composition or substantially pure phthalic anhydride, for example. Because of cost considerations, it is presently preferred to control such a composition by process condition-controlling rather than by post-process blending operations.

Esterification

In general, for use in the present invention, a starting phthalic anhydride bottoms composition is selected which has the following characteristics:

TABLE II

| Characteristics | Broad Range | Preferred Range |
|---|---|---|
| hydroxyl number | about 0 | about 0 |
| acid number | 100–750 | 450–750 |
| phthalic anhydride content | 10–99 wt % | 50–95 wt % |

In Table II, the phthalic anhydride weight percentage based upon total compositional weight of a starting phthalic anhydride bottoms composition in the esterification procedure.

Alternatively, a crude or light ends composition is employed. With such a starting phthalic anhydride bottoms composition is admixed at least one polyol of formula (3) above to produce an initial mole ratio of said polyol to said phthalic anhydride bottoms composition in the range from about 1.9 to 3.0 based upon an estimate of the total acid (e.g., carboxylic acid and/or carboxylic acid anhydride) content of said phthalic anhydride bottoms composition. A presently most-preferred polyol for reaction with phthalic anhydride bottoms starting material is diethylene glycol.

Although phthalic anhydride bottoms comprise mainly phthalic acid anhydride, the remaining components of the phthalic anhydride bottoms mainly appear to comprise components which are acidic in nature and which react with the polyol of formula (3) presumably to produce ester by-products, although the exact composition of the reaction product of a polyol of formula (3) and phthalic anhydride bottoms is at this time not known.

It is a surprising and unexpected fact that, despite the complex nature of the composition produced by reacting phthalic anhydride bottoms with a polyol of formula (1), there is produced a product polyol blend which can be readily and simply utilized for reaction with isocyanate to produce (in the presence of appropriate catalyst) polyisocyanurate foams which have excellent properties that appear generally to be about equal to the properties of corresponding foams made with esters produced by reacting substantially pure phthalic anhydride with polyol of formula (3) as in Example A.

Such a given mixture of phthalic anhydride bottoms composition and polyol, for esterification to occur, it heated with mixing at a temperature ranging from about 195° to 250° C. (preferably from about 210° to 240° C.) under liquid phase conditions. This heating or contacting between polyol and phthalic anhydride bottoms composition is continued until a desired extent of esterification has been achieved. Preferably such heating is continued until the resulting product reaches an hydroxyl number ranging from about 200 to 600 and an acid number ranging from about 0.5 to 7, and more preferably until such reaches an hydroxyl number ranging from about 270 to 400 and an acid number ranging from about 2 to 7.

An alkoxylated glycerine is obtained from Stepan Chemical Company under the trade description "Stepan Foam Polyol 2403". This material has the following characteristics:
hydroxyl number: about 230–245
functionality: about 3
molecular weight: about 700

Example G

An alkoxylated sucrose is obtained from Stepan Chemical Company under the trade designation "Stepan Foam Polyol 3708". Such alkoxylated sucrose has the following characteristics:
hydroxyl number: about 365 to 395
functionality: about 8
molecular weight: about 12,000

Example H

A 17006 pound batch of presently preferred nonionic block ethoxylate propoxylate of nonyl phenol (of formula (1) is produced by first charging 3,900 lbs of appropriate nonyl phenol feed stock to an appropriate alkoxylation reactor of the proper size. This material is then heated to 110° C. and an appropriate amount of potassium hydroxide catalyst is added. After the addition of the catalyst, 4106 pounds of propyene oxide (about 35 moles of addition) is added slowly. Care should be taken to maintain a reaction temperature of between 110° C. to 160° C. during the addition of the propylene oxide. After this addition, the reactor is brought to approximately 110° C. and about 9000 pounds of ethylene oxide (about 65 moles of addition) are added to the reactor very slowly. This is a very exothermic reaction and care should be taken to maintain a reaction temperature of between about 110° to 160° C. The ethoxylation is terminated when the appropriate degree of ethoxylation is achieved; this should occur after approximately all of the 9000 pounds of ethylene oxide are added to the reactor. Proper agitation in the alkoxylation should be maintained during both EO and PO additions. The product has the following characteristics:
molecular weight: about 4800
hydroxyl number: about 12
functionality: about 1
physical state: solid at 25° C.

Example I

An ethoxylated propoxylated butanol of formula (1) is obtained as "Tergitol XH" from Union Carbide Company. This product is believed to have the following approximate characteristics:
molecular weight: about 2400 to 3500
hydroxyl number: about 13 to 24
functionality: about 1
physical state: solid at 25° C.
moles ethylene oxide condensed: about 20 to 50
moles propylene oxide condensed: about 20 to 50 See U.S. Pat. No. 3,078,315.

Example J

An ethoxylated propoxylated ethoxylate of formula (1) is obtained as "Pluronic P-75" from BASF Wyandotte Company. This product is believed to have the following approximate characteristics:
molecular weight: about 3500 to 14000
hydroxyl number: about 8 to 32
functionality: about 2 physical state: solid at 25° C.
moles ethylene oxide condensed: 30 or more
moles propylene oxide condensed: 30 or more

Example K

An organic polyisocyanate trimerization catalyst is obtained under the trade designation "Curithane 97" from the Upjohn Company of Kalamazoo, Michigan.

Example L

A silicone cell stabilizing surfactant is obtained under the trade designation "DC-193" from Dow Corning Company. This surfactant is believed to be comprised of a polyalkylene oxide silicone.

Example M

A fluorocarbon blowing agent is obtained under the trade designation: "Freon 11" from E. I. duPont & Newmours and Co., Wilmington, Del. This agent is believed to comprise trichloromonofluoromethane.

Example N

A diphenyl polyester polyol is obtained under the trademark "Terate 203" from ICI Americas, Inc. This material is believed to comprise a dimethyl teraphthalate polyester polyol.

Example O

An organic polyisocyanate is obtained under "Papi 135" from the Upjohn Company of Kalamazoo, Michigan. This material is believed to comprise polymethylene polyphenyl polyisocyanate.

Example P

To a 5 liter, four-neck, round-bottom flask equipped with a stirrer, thermometer, nitrogen inlet tube, and a goose-neck condenser, there is added 1480 grams (10 moles) or phthalic anhydride, 1060 grams (10 moles) of diethylene glycol, and 1340 grams (10 moles) of tri-methylolpropane. The mixture is heated to 220° C. with stirring and kept at this temperature until the acid number is 6. The hydroxyl number of the colorless liquid polyester polyol phthalate product is found to be 434.

Example Q

The procedure of Example A is repeated except that an equivalent of 2 moles of glycerine is reacted with 1 mole of phthalic anhydride to produce a polyester polyol having an hydroxyl number of about 598.

Example R

The procedure of Example A is repeated except that an equivalent of 1 mole of glycerine and 1 mole of diethylene glycol in admixture are reacted with 1 mole of phthalic anhydride to produce a polyester polyol product having an hydroxyl number of about 496.

Example S

A urethane forming catalyst is obtained under the trade designation "UL-28" from Witco Company. This material is believed to contain an organo tin compound.

Example T

A urethane forming catalyst called diethanolamine is obtained from Olin Corporation.

Example U

A aromatic amine polyol is obtained under the tradename "Thanol R-350-X" from Texaco Chemical Corporation. The polyol is believed to be a phenolic based aromatic amine.
hydroxyl number: about 530
functionality: about 4 to 5
equivalent weight: about 105 (calculated)

Example V

A flame retardant is obtained under the tradename "Antiblaze 80" from Mobil Chemical Corporation. The flame retardant is believed to be a Neutralized Chlorinated Phosphate Ester.

Example W

A cell stabilizing surfactant is obtained under the tradename "LK-443" from Air Products Company. It is believed to be Organic surfactant.

Example X

A trimerization catalyst is obtained under the tradename "TMR-2" from Air Products Company. The catalyst is believed to be ammonium compound on an organic base.

Example Y

To a 5 liter, four-neck, round-bottom flask equipped with a stirrer, thermometer, nitrogen inlet tube, and a goose-neck condenser, there is added 1480 grams (10 moles) of phthalic anhydride, 1060 grams (10 moles) of diethylene glycol, and 1340 grams (10 moles) of tri-methylolpropane. The mixture is kept to 220° C. with stirring and kept at this temperature until the acid number is 6. The hydroxyl number of the colorless liquid polyester polyol phthaliate product is found to be 434.

Example Z

The procedure of Example A is repeated except that an equivalent of 2 moles of glycerine is reacted with 1 mole of phthalic anhydride to produce a polyester polyol having an hydroxyl number of about 598.

Example AA

The procedure of Example A is repeated except that an equivalent of 1 mole of glycerine and 1 mole of diethylene glycol in admixture are reacted with 1 mole of phthalic anhydride to produce a polyester polyol product having an hydroxyl number of about 496.

Example BB

A aromatic polyester polyol is obtained under the tradename Chardol 570 from Chardonol, Inc. This polyol is believed to be a reaction product of glycols with polyethylene teraphthalate residue obtained from film, bottles or fibers. The product has the typical analysis:
Viscosity at 25° C., cps 10,000
Hydroxyl value 340

Example CC

To a three-liter, four neck, resin flask equipped with a stirrer, thermometer, condenser, nitrogen inlet tube, and Barrett distilling receiver, there was charged 444 grams (3 moles) of phthalic anhydride, 576 grams (about 3 moles) of polyethylene teraphthalate reclaim, 954 grams (9 moles) of diethylene glycol, and 200 ppm of Stannous Octoate. This mixture was heated to 225° C. with constant agitation until the acid number was 0.9 and the mixture was readily soluble in acetone. The mixture was cooled to ambient conditions and analyzed for hydroxyl number. The hydroxyl number was found to be 324. The viscosity was found to be 3600 cps. at 25° C. measured using a Brookfield viscometer (model CVT) with a #3 spindle at a speed of 30 rpm.

Polyol Blends of this Invention and Use Thereof

Example 1

The following polyol blend, resin blend, and polyisocyanurate foam are prepared in accordance with this invention. First, a polyol blend of the starting polyols is prepared by hand mixing the components together. The nonionic block ethoxylate propoxylate compound here is the condensate of nonyl phenol with first 35 moles of propylene oxide and then 65 moles of ethylene oxide as described above in Example H. The aromatic polyester polyol is the same as in Example N above. The resulting polyol blend has the composition shown in Table III below.

Next, to prepare a resin blend the catalyst of Example K and the cell stabilizing surfactant of Example L are both dissolved in the polyol blend and, then, the fluorocarbon blowing agent of Example M is dissolved in the system. The resulting resin blend has the composition shown in Table IV below.

The polyol blend and also the resin precursor blend are each clear liquids which are shelf life stable.

The resulting resin precursor blend is mixed with the isocyanate of Example K in a weight ratio of 43.0 to 57.0 resin precursor blend to organic isocyanate. The mixing operation is carried out in a 1 quart cup using a 3500 rpm electric motor driving a stirrer blade. After thorough mixing, the mixture is rapidly poured into a 12"×12"×6" box and allowed to rise freely and cure at room temperature.

Results are summarized below:

| Foam Composition | wt % (100 wt % basis) |
|---|---|
| polyphenyl methylene diisocyanate of Example O | 57.0 |
| resin precursor blend (as prepared above) | 43.0 |

The product foam characteristics are also shown in Table IV below.

Examples 2–10

The procedure of Example 1 is repeated with various changes in composition to produce first a plurality of respective polyol blends as shown in Table III below. Corresponding resin blends are prepared therefrom incorporating each such polyol blend to product compositions as summarized in Table IV below.

All product polyol and resin blends are clear liquids initially which show no signs of separation or turbidity on storage.

When each of the resin blends of Table IV is converted into a foam by the procedure of Example 1, fine cell structured commercially acceptable foams are produced. Foam property data is shown in Table V below.

TABLE III

| EX. # | Polyol Blends (100 weight % basis) | | | | | | | | | |
|---|---|---|---|---|---|---|---|---|---|---|
|  | 1 | 2 | 3 | 4 | 5 | 6 | 7 | 8 | 9 | 10 |
| Ex. A | — | 80.2 | 80.2 | 71.9 | 72.73 | — | 80.2 | 54.39 | 73.1 | — |
| Ex. E | — | — | — | — | — | 70.41 | — | — | — | — |
| Ex. B | — | — | — | — | — | — | — | 5.95 | — | — |
| Ex. N | 80.2 | — | — | — | — | — | — | — | — | — |
| Ex. F | — | — | — | — | — | — | — | 3.31 | — | — |
| Ex. G | — | — | — | — | — | — | — | 3.31 | — | — |
| Diethylene glycol | — | — | — | — | 6.61 | 9.59 | — | 13.24 | 10.4 | — |
| Dipropylene glycol | — | — | — | — | 6.61 | — | — | — | — | — |
| Ex. H | 19.8 | — | 19.8 | 28.1 | 14.05 | 20.0 | — | 19.80 | 16.5 | 19.8 |
| Ex. I | — | 19.8 | — | — | — | — | — | — | — | — |
| Ex. J | — | — | — | — | — | — | 19.8 | — | — | — |
| Ex. BB | — | — | — | — | — | — | — | — | — | 80.2 |

Example 4 produced a polyol that was hazy and a gel at room temperature. This example is used to illustrate what occurs if the level compound of formula (1) is used alone and at too high of a level.

TABLE IV

| Ex. # | Total Resin Blend (100 weight % basis) | | | | | | | | | |
|---|---|---|---|---|---|---|---|---|---|---|
|  | 1 | 2 | 3 | 4 | 5 | 6 | 7 | 8 | 9 | 10 |
| Ex. A |  | 48.5 | 48.5 | 43.5 | 44.0 |  | 48.5 | 32.9 | 44.2 |  |
| Ex. E |  |  |  |  |  | 42.6 |  |  |  |  |
| Ex. B |  |  |  |  |  |  |  | 3.6 |  |  |
| Ex. N | 48.5 |  |  |  |  |  |  |  |  |  |
| Ex. F |  |  |  |  |  |  |  | 2.0 |  |  |
| Ex. G |  |  |  |  |  |  |  | 2.0 |  |  |
| Diethylene Glycol |  |  |  |  | 4.0 | 5.8 |  | 8.0 | 6.3 | 4.0 |
| Dipropylene Glycol |  |  |  |  | 4.0 |  |  |  |  |  |
| Ex. H | 12.0 |  | 12.0 | 17.0 | 8.5 | 12.1 |  | 12.0 | 10.0 | 12.0 |
| Ex. I |  | 12.0 |  |  |  |  |  |  |  |  |
| Ex. J |  |  |  |  |  |  | 12.0 |  |  |  |
| Ex. K | 5.4 | 5.4 | 5.4 | 5.4 | 5.4 | 5.4 | 5.4 | 5.4 | 5.4 | 5.4 |

TABLE IV-continued

| | Total Resin Blend (100 weight % basis) | | | | | | | | | |
|---|---|---|---|---|---|---|---|---|---|---|
| Ex. # | 1 | 2 | 3 | 4 | 5 | 6 | 7 | 8 | 9 | 10 |
| Ex. L | 2.6 | 2.6 | 2.6 | 2.6 | 2.6 | 2.6 | 2.6 | 2.6 | 2.6 | 2.6 |
| Ex. M | 31.5 | 31.5 | 31.5 | 31.5 | 31.5 | 31.5 | 31.5 | 31.5 | 31.5 | 31.5 |
| Ex. BB | | | | | | | | | | 48.5 |

TABLE V

| | Properties | | | | | | | | | |
|---|---|---|---|---|---|---|---|---|---|---|
| EX. # | (1) | (2) | (3) | (4) | (5) | (6) | (7) | (8) | (9) | (10) |
| Reaction Profile at 25° C. | | | | | | | | | | |
| CT, sec | 13 | 16 | 16 | 10 | 21 | 16 | 16 | 30 | 20 | 15 |
| ST, sec | 34 | 66 | 54 | 42 | 63 | 45 | 60 | 66 | 61 | 50 |
| TFT, sec | 46 | 103 | 72 | 57 | 73 | 76 | 100 | 74 | 71 | 60 |
| Core Density, pcf | 1.59 | 1.57 | 1.62 | 1.54 | 1.84 | 1.6 | 1.6 | 2.28 | 1.8 | 1.8 |
| Surface blush | Slight | Slight | Yes | Yes | Yes | Yes | Slight | Yes | Yes | Yes |
| Surface Friability | Moderate | None | None | None | None | None | None | None | None | — |
| NCO/OH Index | 300 | 300 | 300 | 300 | 300 | 300 | 300 | 300 | 300 | 300 |
| Cell Structure | | | | | GOOD | | | | | |
| Resin Viscosity at 25° C. | 5645 cps | 2228 cps | 1665 cps | 1641 cps | 552 cps | 4000 | 2100 cps | 565 cps | 980 cps | |
| Resin Side Appearance | Clear & Stable | Clear & Stable | Clear & Stable | Clear & Stable | Clear & Stable | Clear & Stable | Clear & Stable | Clear & Stable | Clear & Stable | Clear & Stable |

Example 10A

The following polyol blend, resin blend, and polyurethane foam are prepared in accordance with this invention. First, a polyol blend of the starting polyols is prepared by hand mixing the components together. The nonionic block ethoxylate propoxylate compound here is a condensate of nonyl phenol with first 35 moles of propylene oxide and then 65 moles of ethylene oxide (Example F). The aromatic polyester polyol is diethylene glycol phthalate (Example A). A trimethylolpropane phthalate polyol and a phenolic based aromatic amine of Example O.

Next the catalyst (Example M+N+R) and the cell stabilizing surfactant (Example J+Q) are dissolved in the polyol blend. Finally, the fluorocarbon blowing agent (Example K) is dissolved in the system to produce a resin precursor blend (B-side system).

The polyol blend and also the resin precursor blend are each clear liquids.

The resulting resin precursor blend is mixed with the isocyanate of Example 10 in a weight ratio of 50 to 50 resin precursor blend to organic isocyanate. The mixing operation is carried in a 1 quart cup using a 3500 rpm electric motor driving a stirrer blade. After thorough mixing, the mixture is rapidly poured into a 1 gallon cup and allowed to rise freely and cure at room temperature.

Results are summarized in Table VIII.

Examples 11-16

The procedure of Example 1 is repeated with various changes in composition to produce first a plurality of respective polyol blends as shown in Table VI below corresponding resin blends are prepared therefrom incorporating each such polyol blend as summarized in Table VII below.

All product polyol and resin blends are clear liquids initially which show no signs of separation or turbidity on storage.

When the resin blends of Table VII converted to a foam by the procedure of Example 10, fine cell structured commercially acceptable foams are produced. Property data is shown in Table VIII below.

TABLE VI

| | POLYOL BLEND | | | | | | |
|---|---|---|---|---|---|---|---|
| | 10A | 11 | 12 | 13 | 14 | 15 | 16 |
| Diphenyl Polyester Polyol of Ex. L | — | — | — | — | — | 52.1 | 23.08 |
| Monophenyl Polyester Polyol of Ex. A | 47.75 | 49.20 | 49.20 | 50.66 | — | — | 29.03 |
| Monophenyl Polyester Polyol of Ex. E | — | — | — | — | 50.66 | — | — |
| Phenolic based Aromatic Amine of Ex. O | 44.99 | 44.99 | 44.99 | 44.99 | 44.99 | 44.99 | 44.99 |
| Ethoxylated propoxylated nonyl phenol of Ex. F | 4.35 | — | — | 4.35 | 4.35 | 2.90 | 2.90 |
| Ethoxylated propoxylated Butyl Alcohol of Ex. G | — | — | 5.81 | — | — | — | — |
| Ethoxylated propoxylated Ethoxylate of Ex. H | — | 5.81 | — | — | — | — | — |

TABLE VII

| | 10A | 11 | 12 | 13 | 14 | 15 | 16 |
|---|---|---|---|---|---|---|---|
| Ex. L | | | | | | 35.90 | 17.54 |
| Ex. O | 31.00 | 31.00 | 31.00 | 31.00 | 31.00 | 31.00 | 30.38 |
| Ex. A | 32.90 | 33.90 | 33.90 | 34.90 | — | — | 19.60 |
| Ex. B | 2.00 | — | — | — | — | — | — |
| Ex. E | — | — | — | — | 34.90 | — | — |
| Compatibility Agents. | | | | | | | |
| Ex. F | 3.00 | — | — | 3.00 | 3.00 | 2.00 | 2.00 |
| Ex. H | — | 4.00 | — | — | — | — | — |
| Ex. G | — | — | 4.00 | — | — | — | — |
| Ex. P | 6.00 | 6.00 | 6.00 | 6.00 | 6.00 | 6.00 | 5.88 |
| Ex. J | 0.50 | 0.50 | 0.50 | 0.50 | 0.50 | 0.50 | 0.49 |
| Ex. Q | 1.00 | 1.00 | 1.00 | 1.00 | 1.00 | 1.00 | 0.98 |
| Ex. R | 0.52 | 0.52 | 0.52 | 0.52 | 0.52 | 0.52 | 0.51 |
| Ex. M | 0.08 | 0.08 | 0.08 | 0.08 | 0.08 | 0.08 | 0.08 |
| Ex. N | 2.00 | 2.00 | 2.00 | 2.00 | 2.00 | 2.00 | 1.96 |
| Ex. K | 21.00 | 21.00 | 21.00 | 21.00 | 21.00 | 21.00 | 20.58 |

TABLE VIII

| | 10A | 11 | 12 | 13 | 14 | 15 | 16 |
|---|---|---|---|---|---|---|---|
| Resin appearance at 24 hours | Clear/stable | Clear/stable | Clear/stable | Clear/stable | Black/stable | Black/Clear stable | Black/clear stable |
| Viscosity at 25° C. | 516 cps | 562 cps | 561 cps | 577 cps | 2225 cps | 975 cps | 1025 cps |
| Activity Profile CT, sec | 7 | 8 | 9 | 8 | 8 | 7 | 7 |
| TFT, sec | 25 | 28 | 27 | 26 | 25 | 18 | 27 |
| surface friability | NONE | NONE | NONE | NONE | NONE | NONE | NONE |
| Cell Appearance | very fine cells | very fine cells | very fine cells | very fine cells | very fine cells | very fine cells | very fine cells |

(Densities of all foams are generally between 2.5 to 3.0 pcf)
(1) P = 2.53, (2) P = 2.75
NOTE: P = Density Among the starting materials of Examples A-E, N, P, Q, and R any one or more thereof can be blended in quantities as taught herein to make other polyol and/or resin blends of this invention.

As is apparent from the foregoing specification, the invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

I claim:

1. A polyol blend composition useful in the preparation of polyisocyanurate and/or polyurethane foams comprising on a 100 weight percent total weight basis:
(A) from about 0.5 to 20 weight percent of at least one nonionic block ethoxylated propoxylate compound of the formula:

$$RO(CH_2CHO)_p\text{---}(CH_2CHO)_n\text{---}(CH_2CH_2O)_m\text{---}H \quad (1)$$
$$\phantom{RO(CH_2CHO)_p\,}| \phantom{---(CH_2CHO)_n\,}|$$
$$\phantom{RO(CH_2CHO)_p}CH_3 \phantom{---(CH_2CHO)_n}X$$

wherein:
R is a radical selected from the group consisting of alkyl phenyl radicals wherein the alkyl group in each such radical contains from about five to eighteen carbon atoms; alkyl radicals each containing from two through eighteen carbon atoms; and radicals of the formula:

$$(CH_2CH_2O)_m\text{---}H,$$

X is selected from the group consisting of methyl and hydrogen,
p is a positive whole number ranging from about 10 to 5,
n is a positive whole number ranging from about 10 to 70,
m is an independently selected positive whole number ranging from about 15 to 250, and the sum of m plus n plus p is a number in the range from about 35 to 200 in any given molecule;
(B) from about 20 to 93 weight percent of at least one aromatic polyester polyol characterized by having a molecular weight in the range from about 200 to 1200, an hydroxyl value ranging from about 45 to 2000, a functionality ranging from 2 to 8; and a molecular structure selected from the group consisting of monophenyl polyesters, diphenyl polyesters, and benzyl polyesters; and reaction products of glycols with polyethylene teraphthalate residue products
(C) from and including 0 to about 40 weight percent of at least one second hydroxyl group containing polyol characterized by having a molecular weight in the range from about 60 to 1200, an hydroxyl value in the range from about 45 to 1600, and a funtionality in the range from about 2 to 8, and which is preferably selected from the class consisting of:
(a) polyalkoxylated Mannich bases prepared by reacting phenols with diethanol amine and formaldehyde,
(b) polyalkoxylated glycerines,
(c) polyalkoxylated sucrose,
(d) polyalkoxylated aromatic and aliphatic amine based polyols,
(e) polyalkoxylated sucrose-amine mixtures,
(f) hydroxyalkylated aliphatic monoamines and/or diamines,
(g) aliphatic polyols,
(h) polybutadiene resins having primary hydroxyl groups, and
(i) phosphorous containing polyols
said polyol blend composition having an hydroxyl number in the range from about 150 to 600.

2. The polyol blend composition of claim 1 wherein said aromatic ester polyol is characterized by the generic formula:

$$\begin{array}{c} \text{\Large$\bigcirc$}\!\!\!\!\!\!\!\!\!\!\!\!\!\!\!\!\!\!\!\!\!\!\!\!\begin{array}{c}\text{C}\!-\!\text{O}\!-\!R^1\!-\!\text{OH}\\ \|\\ \text{O}\end{array} \\ \begin{array}{c}\|\text{O}\\ \text{C}\!-\!\text{O}\!-\!R^1\!-\!\text{OH}\end{array} \end{array}$$

wherein:
$R^1$ is a divalent radical selected from the group consisting of:
(a) alkylene radicals each containing from 2 through 6 carbon atoms,
(b) alkoxyalkylene radicals each containing one oxygen atom and from 3 through 7 carbon atoms,
(c) radicals of the formula:

$$-CH_2-R^2-CH_2-$$

wherein:
$R^2$ is a radical selected from the group consisting of:

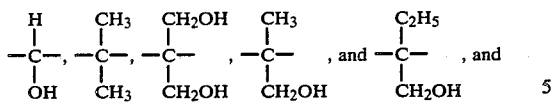

wherein:

$R^3$ is an alkylene radical containing from 2 through 4 carbon atoms, and n is an integer of from 2 through 6.

3. A miscible blend composition comprising on a 100 weight percent total weight basis:

(A) from about 10 to 50 weight percent of a fluorocarbon blowing agent, (B) from and including 0 up to about 25 weight percent water, (C) from and including 0 to about 10 weight percent of a cell stabilizing surfactant, and (D) the balance up to 100 weight percent being a polyol blend composition of claim 1.

4. The blend composition of claim 3 additionally including from about 0.5 to 10 weight percent of a catalyst selected from the group consisting of trimerization catalysts, urethane-forming catalysts, and mixtures thereof.

5. A homogeneous resin precursor blend composition comprising on a 100 weight percent total resin blend basis:

(A) from about 6 to 50 weight percent of at least one nonionic block ethoxylate propoxylate compound of the formula:

$$RO(CH_2CHO)_p-(CH_2CHO)_n-(CH_2CH_2O)_m-H \quad (1)$$
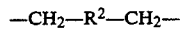

wherein:

R is a radical selected from the group consisting of alkyl phenyl radicals wherein the alkyl group in each such radical contains from about five to eighteen carbon atoms; alkyl radicals each containing from two through eighteen carbon atoms; and radicals of the formula:

$(CH_2CH_2O)_m-H$,

X is selected from the group consisting of methyl and hydrogen, p is a positive whole number ranging from about 1 to 5, n is a positive whole number ranging from about 10 to 70, m is a positive whole number ranging from about 15 to 250, the sum of m plus n plus p is a number in the range from about 35 to 200 in any given molecule, (B) from about 20 to 93 weight percent of at least one aromatic polyester polyol of the formula:

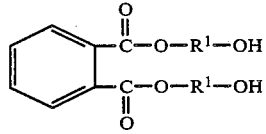

wherein:

$R^1$ is a divalent radical selected from the group consisting of:

(a) alkylene radicals each containing from 2 through 6 carbon atoms, (b) alkoxyalkylene radicals each containing one oxygen atom and from 2 through 7 carbon atoms, (c) radicals of the formula:

$-CH_2-R^2-CH_2-$ wherein:

$R^2$ is a radical selected from the group consisting of:

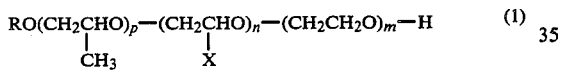

(d) radicals of the formula:

$-(R^3O)_n-R^3-$ wherein:

$R^3$ is an alkylene radical containing from 2 through 4 carbon atoms and n is an integer of from 2 through 6.

(C) from 0 to about 30 weight percent of at least one polyol selected from the group consisting of dialkylene glycols and alkoxylated glycerines, such polyols having a functionality less than 5, (D) from about 10 to 50 weight percent of a fluorocarbon blowing agent, (E) from 0.1 to 10 weight percent water, (F) from about 0.5 to 10 weight percent trimerization catalyst, and (G) from about 0.1 to 10 weight percent of a cell stabilizing surfactant.

6. A miscible resin precursor blend composition comprising on a 100 weight percent total resin blend basis:

(A) from about 0.1 to 6.0 weight percent of at least one nonionic block ethoxylate propoxylate compound of the formula:

$$RO(CH_2CHO)_p-(CH_2CHO)_n-(CH_2CH_2O)_m-H$$
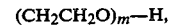

wherein:

R is a radical selected from the group consisting of alkyl phenyl radicals wherein the alkyl group in each such radical contains from about five to eighteen carbon atoms, alkyl radicals each containing from two through eighteen carbon atoms; and radicals of the formula:

$(CH_2CH_2O)_m-H$,

X is selected from the group consisting of methyl and hydrogen, p is a positive whole number ranging from about 1 to 5, n is a positive whole number ranging from about 10 to 70, m is a positive whole number ranging from about 15 to 250, the sum of m plus n plus p is a number in the range from about 30 to 200 in any given molecule;

(B) from about 1 to 50 weight percent of at least one aromatic ester polyol of the formula:

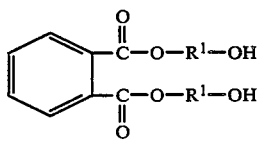

wherein:

$R^1$ is a divalent radical selected from the group consisting of:
(a) alkylene radicals each containing from 2 through 6 carbon atoms,
(b) alkoxyalkylene radicals each containing one oxygen atom and from 3 through 7 carbon atoms,
(c) radicals of the formula:

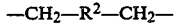

$R^2$ is a radical selected from the group consisting of:

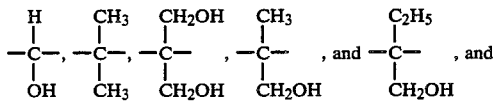

(d) radicals of the formula:

Rhu 3 is an alkylene radical containing from 2 through 4 carbon atoms and n is an integer of from 2 through 6.
(C) from about 10 to 95 weight percent of at least one polyol having a functionality of about 2 to 8.
(D) from about 0.1 to 10 weight percent of a urethane forming catalyst,
(E) from about 0 to 50 weight percent of a fluorocarbon blowing agent, and/or from 0 to about 25 weight percent water,
(F) from about 0.1 to 10 weight percent of a cell stabilizing surfactant.

7. The resin blend of claim 5 wherein said aromatic polyester polyol comprises diethylene glycol phthalate.

8. The resin blend of claim 6 wherein said aromatic polyester polyol comprises diethylene glycol phthalate.

9. In a process for the preparation of a cellular polymer in which the major recurring polymer unit is an isocyanurate moiety, said process comprising the trimerization of an organic isocyanate in the presence of at least one resin blend of claim 5, the improvement which comprises preparing said cellular polymer by bringing together a combination of an organic polyisocyanate, and said resin blend, there being in such combination from about 0.20 to 0.50 hydroxyl equivalents of said resin precursor blend per NCO equivalent of said polyisocyanate.

10. The process of claim 9 wherein said polyisocyanate is a polymethylene polyphenyl polyisocyanate.

11. The process of claim 9 wherein said one aromatic polyester polyol is diethylene glycol phthalate.

12. A process for the preparation of a cellular polymer in which the major recurring unit is an isocyanurate moiety, said process comprising mixing together a polymethylene polyphenyl polyisocyanate, and a resin precursor blend composition of claim 5, while maintaining from about 0.20 to 0.50 equivalents of said resin precursor blend of claim 5 per each equivalent of said polyisocyanate.

13. The process of claim 12 wherein said aromatic polyester polyol is diethylene glycol phthalate.

14. The cellular polyisocyanurate produced by the process of claim 9.

15. The cellular polyisocyanurate produced by the process of claim 12.

16. The polyol blend composition of claim 1 wherein said other polyol is selected from the group consisting of alkylene diols, lower alkoxyalkylene diols, and mixtures thereof having molecular weights from about 62 to 400.

17. The polyol blend composition of claim 1 wherein said ethoxylated propoxylate compound is characterized by the formula:

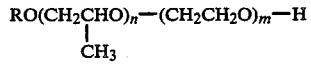

where:
n is a positive whole number of from about 25 to 70,
m is a positive whole number of from about 50 to 150,
and the sum of m plus n ranges from about 35 to 200.

* * * * *